United States Patent [19]

Fiorentino

[11] 4,037,397
[45] July 26, 1977

[54] LAWN RAKES

[76] Inventor: Donald Fiorentino, 8 Skytop Road, Edison, N.J. 08817

[21] Appl. No.: 721,281

[22] Filed: Sept. 8, 1976

[51] Int. Cl.² ............................................. A01D 7/10
[52] U.S. Cl. ................................. 56/400.12; 294/50.8
[58] Field of Search ................... 294/19 R, 50.5, 50.6, 294/50.8, 50.9, 51, 52, 104; 7/1 L; 15/104.8, 257.2, 257.6, 257.7; 56/400.04, 400.11, 400.12

[56] References Cited

U.S. PATENT DOCUMENTS

| 659,518 | 10/1900 | Estlack | 294/50.8 |
|---|---|---|---|
| 1,222,711 | 4/1917 | Armstrong | 294/50.8 |
| 1,588,927 | 6/1926 | Willis | 294/50.8 |
| 2,908,131 | 10/1959 | Ross | 294/50.6 |
| 3,095,682 | 7/1963 | Pasquine | 56/400.12 |
| 3,643,410 | 2/1972 | Menning | 56/400.12 |
| 3,688,484 | 9/1972 | Cox | 56/400.12 |

Primary Examiner—Johnny D. Cherry

[57] ABSTRACT

A combination rake and pickup device with a pair of rake heads mounted to pivot relative to each other from a closed position in which the rake may be used in a conventional way to an open position in which necessary leverage is obtained to pick up debris by the open rake heads.

3 Claims, 3 Drawing Figures

4,037,397

LAWN RAKES

BACKGROUND OF THE INVENTION

The present invention relates to rakes generally, but more particularly to a device including a pair of rakes to be used in combination with each other.

The problems in the removing of leaves, grass cuttings, and other debris from lawns are well appreciated and prior art attempts have been made to provide a combination rake and pickup device as illustrated in U.S. Pat. Nos. 3,350,866 and 3,601,966. The devices disclosed in these patents do not provide the user with the necessary means to adequately handle the raking and picking up of the leaves and other objects.

OBJECTS OF THE INVENTION

An object of the present invention is to provide a combination rake and pickup device to overcome the objections to the prior art devices.

Another object of the present invention is to provide a combination rake and pickup device which utilizes two cooperating rake heads that may be used to initially accumulate leaves, paper, sticks, grass clippings, small branches, and other lawn debris merely by raking a lawn in the usual manner, and thereafter using the device to pick up the accumulated debris.

Another object of the present invention is to provide a pair of rakes operating together which are not heavy and are used for the quick removal from a lawn of random debris, and which will pick up many more types of debris than a sharp-pointed stick.

Other objects and advantages of the present invention will become apparent as the disclosure proceeds.

SUMMARY OF THE INVENTION

A combination rake and pickup device for leaves or the like that includes a first rake head including a plurality of first tines, with an elongated handle extending from the first rake head, and a second rake head oppositely disposed to the first rake head on one side thereof and including a plurality of second tines. An elongated support member extends from the second rake head and has an intermediate section crossing the handle and an arm disposed on the opposite side of the handle and adapted to be gripped by the user of the device. Pivot means removably couples the intermediate section below the arm to the handle such that manual positioning of the arm moves the second rake head between a closed position with the first and second tines extending in substantially parallel spaced apart relationship to each other to an open position with the first and second tines spaced from each other, and latching means coupled to the handle and adapted to releasably engage the arm so as to obtain retention of the arm relative to the handle in the closed position of the rake and permiting manual release therefrom for movement of the second tines relative to the first tines.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
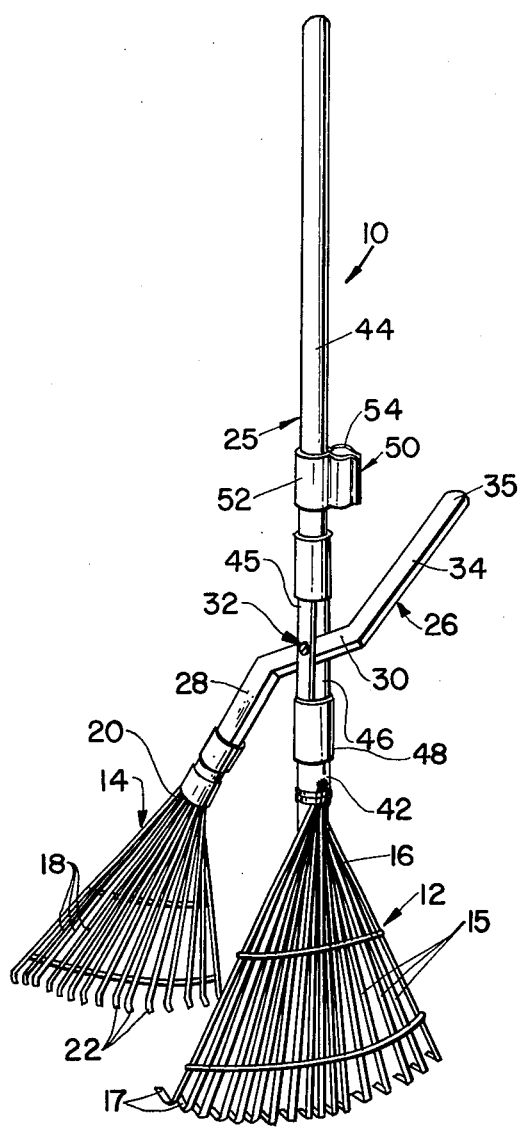
FIG. 1 is a perspective view of the device in accordance with the present invention.
Figure 2:
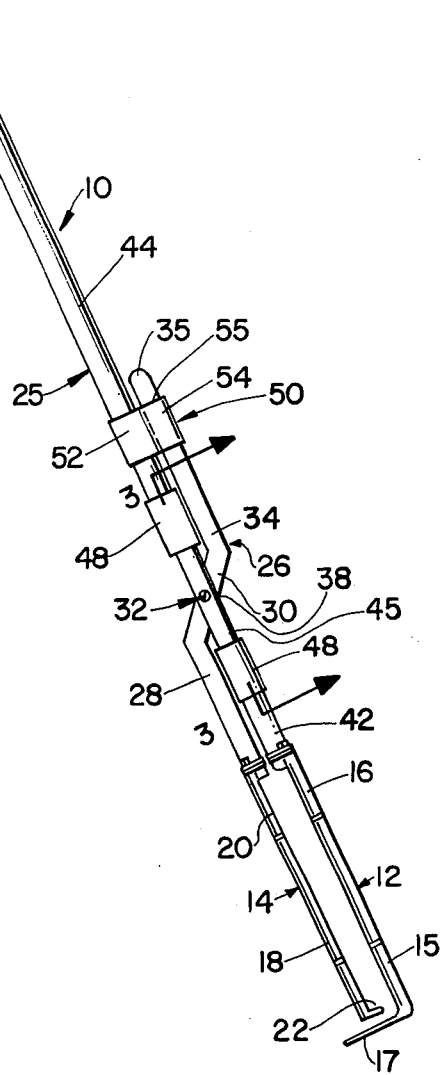
FIG. 2 is a side plan view of the combination rake and pickup device shown in the closed position thereof.
Figure 3:
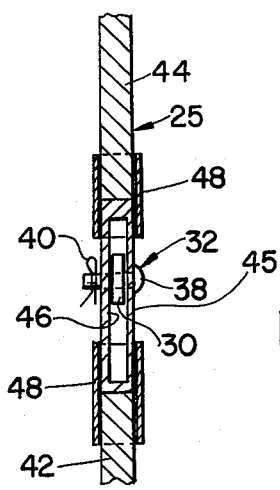
FIG. 3 is a sectional view taken along line 3—3 of FIG. 2.

Referring to the drawings in detail, there is illustrated in FIGS. 1-3 a preferred embodiment of the invention for a combination rake and pickup device 10 that may be manufactured from straw for a certain portion thereof and the rest from wood, plastic, or metallic materials. The device 10 includes a first rake 12 and a second rake 14 that operate with each other or individually as hereinafter described.

The first rake 12 includes a plurality of tines 15 that fan outwardly from one end 16 and terminate in a plurality of free ends or tips 17 at one end thereof. As seen in FIG. 2, the first tines 15 have the first free ends 17 extending outwardly therefrom in a plane substantially normal thereto and facing the second rake head 14. The second rake head 14 is oppositely disposed to the first rake head 12 on one side thereof and includes a plurality of second tines 18 that fan outwardly from one end 20 and terminate in a plurality of second free ends 22 that are shorter in length than the first free ends 17 and extend inwardly from the second tines 18 towards the first tines 15. As seen in FIG. 2, the free ends 22 extend above the free ends 17.

The first rake head 12 has an elongated handle 25 extending from the first rake head 12 and of sufficient length to be readily grasped by the user of the device 10 for a normal raking of the lawn, etc. By permitting normal usage of the first rake head 12, then the device 10 may easily be used when in the assembled position as illustrated in FIG. 2.

The second rake head 14 has an elongated support member 26 extending from the upper end 20 of the second rake head 14. The support member 26 includes a base section 28 that extends substantially parallel to the handle 25 in the closed position of the base 10. The base section 28 is connected to the upper end 20 in a conventional manner. The support member 26 further includes an intermediate section 30 angularly disposed relative to the base section 28 and joined thereto at one end thereof. Intermediate section 30 is designed for crossing the handle 25 and by pivot means 32 is adapted for moving angularly with respect to the handle 25. An arm 34 is coupled at one end to the intermediate section 30 with the opposite end or terminal end 35 free to be grasped by the user of the device.

The pivot means 32 permits the second rake head 14 to pivot for manual positioning from the position illustrated in FIG. 2 to the open position illustrated in FIG. 1. The pivot means 32 includes a transversely extending pin or other fastener 38 that extends through the handle 25 and intermediate section 30. A cotter pin 40 or other readily removable clip, may be provided to permit removal of the fastener 38 from the position illustrated in FIG. 3.

In the assembled position of the device 10 as illustrated in the drawings, movement by the user of the arm 34 permits controlled manual rotation of the second rake head 14 between a closed position, set forth in FIG. 2, to the open position set forth in FIG. 1 with the tines 15 and 18 separated from each other. In the open position illustrated in FIG. 1, after the debris has been accumulated the user positions the open end portions 17 and 22 beneath the pile of debris, and by manually moving the arm 34 obtains sufficient leverage to grasp the debris between the tines 15 and 18 and lift the debris for depositing in an appropriate waste receptacle.

The handle 25 includes a front section or lower handle portion 42 connected to the first rake head 12 at the upper end 16 thereof in a conventional manner. A rear section or upper handle portion 44 is mounted in fixed spaced relationship to the lower handle portion 42 by means of a bracket 45 disposed therebetween. The bracket 45 has an elongated cavity 46 through which the intermediate section 30 extends as well as the transversely extending pin 38. The length of the cavity 46 is selected to permit the rotational height required for the support member 26.

To maintain in fixed relationship the bracket 45 at one end with the lower handle portion 42 and at the other end with the upper handle portion 44, joining means 48 is provided. The joining means 48 may be in the form of a tubular member extending in telescopic relationship at each end of the bracket 45 to retain the components in fixed relationship to each other. By providing the pivot means 32 with the fastener 38 extending transversely through the bracket 45 in a manner to be removed therefrom, independent use of either the first rake head 12 or second rake head 14 is obtained. For example, the second rake head 14 may be used by a child as the adult uses the first rake head 12. Then when sufficient debris has been accumulated, the rake head may be assembled and utilized as described above.

To maintain the rake heads 12 and 14 coupled together when not in use, latching means 50 is provided and coupled to the handle 25 at the upper handle portion 44 and adapted to releasably engage the arm 34 of the support member 26. In this manner retention of the arm 34 relative to the handle 25 in the closed position of the rake is obtained while permitting manual release therefrom for movement of the second tines 18 relative to the first tines 15.

The latching means 50 includes a vertically extending latch member 52 secured to the handle 25 along one edge thereof and a pair of spaced apart resilient prongs or clips 54 adapted to receive the arm 34 therebetween. The arm 34 extends beyond one end 55 of the prongs 54 to facilitate gripping by the user for both engagement with and release from the latch member 52.

The device 10 is constructed that the handle 25 may be of circular configuration to facilitate gripping with the elongated handle 26 having a flat spaced surface on each side thereof to be received within the cavity 46. In this manner the device 10 functions for its intended purpose and permits the necessary movement between the respective sections so as to be used as both a trapping device for leaves and other debris as well as a regular lawn rake by using the free ends 17 of the first rake head 12 either with the second rake head 14 removed therefrom or left in their assembled position as illustrated in FIG. 2.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A combination rake and pickup device comprising:
  a. a first rake head including a plurality of first tines,
  b. said first tines include a plurality of first free ends extending outwardly from each of said first tines,
  c. an elongated handle extending from said first rake head, said elongated handle being of sufficient length to permit normal use of said first rake head and having a cavity extending therethrough,
  d. said handle includes:
    1. a bracket having said cavity therein,
    2. a lower handle portion connected to said first rake head at one end thereof and said bracket at the other end thereof, and
    3. an upper handle portion connected to said bracket at one end thereof with the opposite end thereof adapted to be gripped by the user of the device,
  e. a second rake head oppositely disposed to said first rake head on one side thereof and including a plurality of second tines,
  f. said second tines terminate above said first free ends and include a plurality of second free ends shorter than said first free ends and extending inwardly towards said first tines,
  g. an elongated support member extending from said second rake head and having an intermediate section crossing said handle and an arm disposed on the opposite side of said handle and adapted to be gripped by the user of the device,
  h. said support member includes:
    1. a base section connected at one end thereof to said second rake head,
    2. said intermediate section angularly disposed relative to said base section and connected at one end thereof to the other end of said base section, said intermediate section crossing said handle through said cavity and pivotably secured thereto by said pivot means, and
    3. said arm connected to said intermediate section at one end thereof and extending upwardly therefrom,
  i. pivot means removably coupling said intermediate section below said arm to said handle such that manual positioning of said arm moves said second rake head between a closed position with said first and second tines extending in substantially parallel spaced apart relationship to each other to an open position with said first and second tines spaced from each other,
  j. said pivot means includes a fastener extending transversely through said bracket and said intermediate section and adapted to be removed therefrom for independent use of either said first rake head or said second rake head, and
  k. latching means coupled to said handle and adapted to releasably engage said arm so as to obtain retention of said arm relative to said handle in the closed position of the rake and permitting manual release therefrom for movement of said second tines relative to said first tines.

2. The combination rake and pickup device of claim 1, and further including means for joining said handle portions to said bracket.

3. The combination rake and pickup device of claim 1, wherein said latching means includes a vertically extending latch member secured to said handle along one edge thereof and a pair of spaced apart resilient prongs adapted to receive said arm therebetween with said arm extending beyond one end thereof to facilitate gripping by the user for both engagement with and release from said latch member.

* * * * *